RADIATION ACTUATED BINARY COUNTER SYSTEM AND CIRCUITS THEREFOR

Filed Jan. 4, 1956 2 Sheets-Sheet 1

INVENTOR
THOMAS I. RESS
BY Campbell, Brumbaugh, Free and Graves
HIS ATTORNEYS

INVENTOR
THOMAS I. RESS
BY Campbell, Brumbaugh Free and Graves
HIS ATTORNEYS

United States Patent Office 3,169,190
Patented Feb. 9, 1965

3,169,190

RADIATION ACTUATED BINARY COUNTER SYSTEM AND CIRCUITS THEREFOR

Thomas I. Ress, Poughkeepsie, N.Y., assignor to International Business Machines Corporation, New York, N.Y., a corporation of New York Filed Jan. 4, 1956, Ser. No. 557,381
17 Claims. (Cl. 250—209)

This invention relates generally to binary counter systems and components therefor, and more particularly to a system of this sort which has circuits adapted to be actuated by electromagnetic radiation.

In the performance of operations which may be utilized for computing purposes, it is found in many instances that conventional electric circuits are not well adapted to carry out these operations when the input signals which initiate the operations are in the nature of radiation input signals.

It is accordingly an object of this invention to provide circuits which are responsive to an input in the form of electromagnetic radiation to cause operative effects in the circuits which are usable for computing purposes.

A further object of the invention is to provide circuits of the above character which may be integrated into a binary counter system.

These and other objects are realized according to the invention by providing first radiation responsive means having electrical reference and anti-reference states and adapted to be changed from the former to the latter state by a pulse of electromagnetic radiation, second radiation responsive means adapted to provide an indication in response to such pulse only when previously conditioned to respond thereto, radiant energy conductor means having an input and two outputs respectively coupled to the two radiation responsive means to transmit to each thereof successive radiant energy pulses received at the input of the conductor means, and means responsive to a change from reference to anti-reference state induced in the first radiation responsive means by the first pulse in a transmitted pair thereof for conditioning the second radiation responsive means to respond to the second pulse in the pair. A circuit of this sort is of useful application in that it is adapted to selectively indicate the presence of the second pulse in a pair of electromagnetic radiation pulses.

As a feature according to the invention, the response of the mentioned second means to the second electromagnetic radiation pulse in a pair thereof may be utilized to restore the mentioned first means to reference state and to render the mentioned second means insensitive to such pulses until the second means has again been conditioned to respond thereto. In this manner the described apparatus will be given a cyclical mode of operation such that the mentioned second means will selectively indicate the second pulse of each of several pairs of pulses which occur in time succession.

As another feature according to the invention, several of the circuits described above may be integrated together into a counter system for the electromagnetic radiation pulses. If these pulses are considered to represent binary digits, the system will be in the nature of a binary digit counter system.

For a better understanding of the invention, reference is made to the following description, taken in conjunction with the accompanying drawings wherein.

In the following description counterpart elements will be designated by the same number, but will be distinguished from each other by utilizing different suffixes for the numerical designations thereof. It will be accordingly understood that, unless the context otherwise requires, the description hereinafter of an element having a certain numerical designation and suffix shall be considered to apply to any other element having the same numerical designation but a different suffix.

Figure 1:
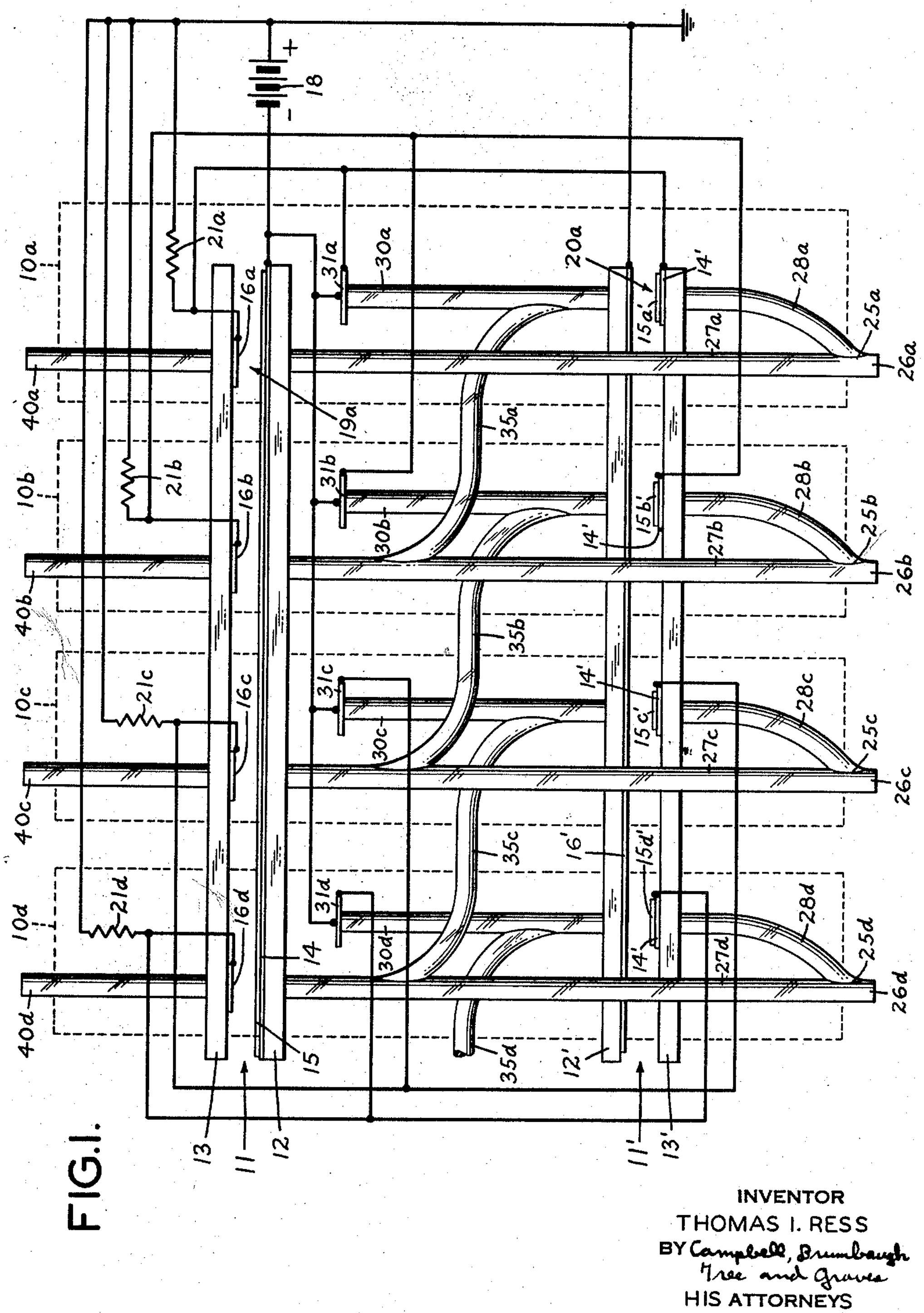
FIG. 1 is a schematic circuit diagram of an exemplary embodiment.

Referring now to FIG. 1, the numbers 10*a*, 10*b*, 10*c*, and 10*d* designate a plurality of counter stages representing in their stated order a succession of binary digits of progressively higher rank, as, say, the digits of rank 1, 2, 4 and 8 in decimal terms. The numbers 11 and 11' generally designate a pair of ionization chambers which are each common to all of the aforementioned stages, and which, in general, may be of the type disclosed in the article "Electronic Photography" by Kurt S. Lion in the December 1953 issue of *Research Reviews*. Since the chambers 11 and 11' are essentially similar, only the chamber 11 will be described in detail.

The chamber 11 comprises a pair of plate members 12 and 13 which are spaced apart in parallel relation, and which enclose therebetween a heavy ionizable medium such as ether vapor. Each of the plate members 12 and 13 is transparent to "electromagnetic radiation" by which is meant radiation in the ultraviolet, visible light and infrared portions of the electromagnetic spectrum. The member 12 has deposited on the inner wall thereof an electrically conductive coating 14 which is transparent to the said electromagnetic radiation, and which may be similar to the transparent electroconductive coating deposited on the inner wall of the face plates of cathode ray tubes used in television receivers. The coating 14 has deposited thereon a very thin coating 15 of material adapted to emit exo-electrons in the presence of radiant energy falling on the material. The coating 15 must also be sufficiently thin to be at least partially transparent to radiation passing through coating 14 in order that this radiation may cause exo-electrons to be emitted from the surface of coating 15 which is presented to plate 13. Thus, coating 15 may be formed, for example, of a layer of tungsten or gold having a thickness of from 30 to 60 Angstrom units. The coating 15 acts as a common electrode for all of the stages 10*a*–10*d*.

The plate member 13 carries on its inner wall, as respective parts of the stages 10*a*, 10*b*, 10*c*, 10*d*, a plurality of electrically conducting elements 16*a*, 16*b*, 16*c*, 16*d*. Each of these elements is electrically insulated from its counterpart elements to act as an individual terminal electrode for its stage. Also, each of elements 16*a*–16*d* is in the nature of an ion target composed of phosphor material which luminesces in the presence of an ion discharge terminating on the element. For better current conduction the phosphor material in each of elements 16*a*–16*d* may be underlain by a transparent electroconductive localized coating similar to the already described coating 15 for plate 12.

The chamber 11' is similar to the chamber 11 except that the coating 16' of phosphor material acts as the common electrode for stages 10*a*–10*d*, and the exo-electron emissive coatings 15*a'*–15*d'* act as the individual electrodes for these stages.

Figure 3:
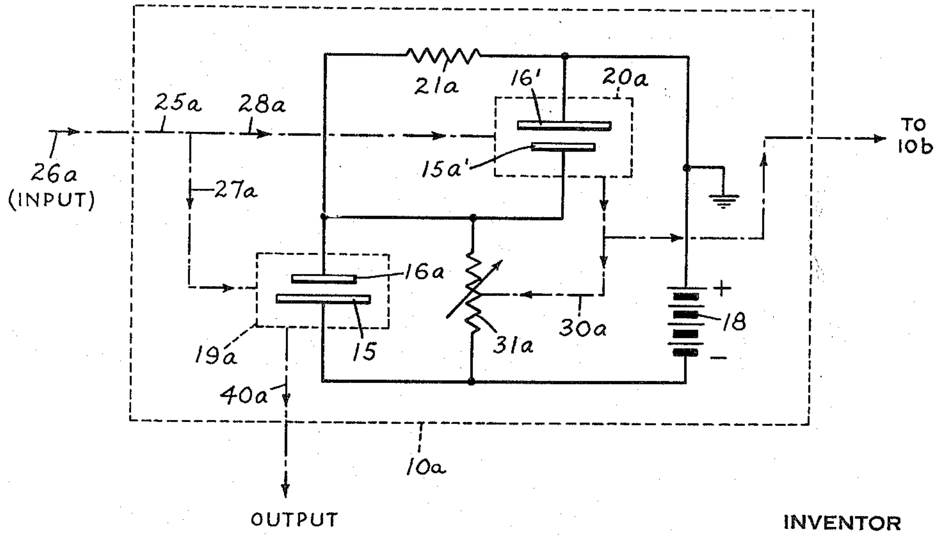
FIG. 3 is a schematic circuit diagram explanatory of one of the component circuits of the FIG. 1 embodiment.

The other components of the FIG. 1 embodiment may be best described by considering the same in terms of the stages thereof, and since stages 10*a* to 10*d* are essentially similar, only stage 10*a* will be described in detail. Referring to FIG. 3, in stage 10*a* the negative terminal of a common voltage source 18 for all the stages is connected to the common electrode 15 for all the stages, and the grounded positive terminal of source 18 is connected through a resistor 21*a* to the individual electrode 16*a* for the stage 10*a*. By virtue of this connection, the region of the inoizable medium between electrode 16*a* and electrode 15 is adapted to be ionized by an electromagnetic radiation or "radiant energy" pulse transmitted to this region to thereafter sustain a localized ion discharge in this region between the electrodes 16*a* and 15. The local organization 19*a* within ionization chamber 11 of electrodes 16*a* and the opposite portion of electrode 15 is thus in the nature of a radiation responsive means which is adapted to change from a reference (deionized) state to an anti-reference (ionized) state in response to a radiant energy pulse. This local organization is also in the nature of a light amplifier means inasmuch as the luminescent output, in the presence of an ion discharge, of the electrode 16*a* of phosphor material is considerably greater in energy content than the energy content of the radiant energy pulse which initiates the ion discharge. The described local organization is also in the nature of an ion discharge "cell" inasmuch as this local organization, although incorporated in the common ionization chamber 11 with other similar local organizations, is a separate unit of activity from these other local organizations.

The stage 10*a* includes an additional local organization 20*a* which is also in the nature of a radiation responsive means, a light amplifier means, and an ion discharge cell. This additional local organization is represented by the localized portion of ionization chamber 11' which includes the electrode 15*a'* of stage 10*a* and the portion of electrode 16' which is opposite to electrode 15*a'*. Of these electrodes, the electrode 16' is connected to the positive terminal of voltage source 18 while the electrode 15*a'* is connected to the electrical junction of resistor 21*a* and electrode 16*a*. The ion discharge cell 20*a* is thus connected in parallel relation with resistor 21*a*.

By virtue of its parallel connection with resistor 21*a*, the ion discharge cell 20*a* is energized by the voltage drop across this resistor. This voltage drop in accordance with its value renders the last-mentioned ion discharge cell selectively ionizable in the following manner. When the discharge cell 19*a* is in deionized state, this cell is of very high impedance with the result that virtually no current is drawn through resistor 21*a*. It ensues that the value of voltage drop across resistor 21*a* is lower than the voltage value required for the discharge cell 20*a* to ionize. Thus, prior to ionization of cell 19*a* the cell 20*a* cannot be ionized.

When, however, the cell 19*a* becomes ionized in response to a radiant energy pulse received thereby, the resulting low impedance of the cell causes a relatively large amount of current to be drawn through resistor 21*a*. The ensuing voltage drop across resistor 21*a* is at least large enough in value to render the cell 20*a* ionizable by a radiant energy pulse received by the cell. The resistor 21*a* is thus a means which responds to the change in state of the cell 19*a* to condition the cell 20*a* to respond to a radiant energy pulse. Of course, when the last-mentioned cell has been so conditioned, this cell will respond to a subsequent radiant energy pulse to become ionized.

Pulses of radiant energy are transmitted to the stage 10*a* by a radiant energy conductor means 25*a* which may be, say, a light duct composed of methylcryalate resin. This light duct at some point beyond an input 26*a* separates into two branches 27*a* and 28*a* having individual outputs respectively coupled to the ion discharge cell 19*a* and the ion discharge cell 20*a*. The branches 27*a*, 28*a* thus serve to transmit to both of these cells a succession of radiant energy pulses received at the input 26*a*.

When the cell 20*a* becomes ionized in response to a radiant energy pulse, the ion discharge in the cell excites the electrode 16' of phosphor material to luminesce to thereby produce a radiant energy signal. This radiant energy signal is conducted via a radiant energy transmission means in the form of, say, a light duct 30*a* (of, say, methylcryalate resin) to a photoelectric means 31*a* adapted, responsive to this signal, to restore the cell 19*a* to deionized state. This photoelectric means may take the form, for example, of a body of photoconductive material connected in shunt relation between the electrodes 15 and 16*a*. Ordinarily, the photoconductive material 31*a* is of sufficiently high impedance that a voltage of ionizing value may be maintained without difficulty between the last-named electrodes. When, however, the material 31*a* is irradiated with the radiant energy signal transmitted thereto, the impedance of the material drops low enough to create a partial short across the electrodes 15 and 16*a*. This partial short causes the ion discharge between the two electrodes to be extinguished.

The mode of operation of stage 10*a* is as follows. Assume initially that both of cells 19*a* and 20*a* are deionized, and that a succession of radiant energy pulses is received at the input 26*a* of light duct 25*a*. The first of these pulses is transmitted to both of cells 19*a* and 20*a*, but this first pulse fires only cell 19*a* inasmuch as the voltage impressed across cell 20*a* is not at the time of a value sufficient to sustain an ion discharge therein. When, however, cell 19*a* becomes ionized in response to the first pulse, the voltage cell 20*a* jumps, as previously described, to ionizing voltage value. By this voltage jump, the cell 20*a* is conditioned to respond to the next radiant energy pulse.

The second pulse received at input 26*a* will, like the first pulse, be transmitted to both the ion discharge cells of stage 10*a*. This second pulse has no effect on the cell 19*a* inasmuch as this cell has already been fired by the first pulse, and, hence, cannot respond further to the second pulse. In the view, however, that the cell 20*a* at the time of occurrence of the second pulse is conditioned to respond to radiant energy pulses, the second pulse fires this last-named cell to render the same ionized. The ion discharge through cell 20*a* excites therein the electrode 16' of phosphor material to provide the described radiant energy signal which is transmitted to photoconductive impedance 31*a*. This radiant energy signal reduces the impedance of photoconductive body 31*a* to cause the ion discharge through cell 19*a* to be extinguished. When the ion discharge through this last-named cell is extinguished, the current flow through resistor 21*a* is cut off to decrease the voltage across the cell 20*a* to the point where the ion discharge therein is also extinguished. It follows that, subsequent to the second pulse but prior to the third pulse, the stage 10*a* is restored to its initial condition in that both of the ion discharge cells therein have been returned to their initial deionized state. Because, however, of the time lag of response of the photoconducitve impedance 31*a* and the other circuit elements in stage 10*a*, and because of the luminous persistance of the phosphor material of electrode 16', the radiant energy signal produced by cell 20*a* has a duration which may be made to be of the same order as the duration of the radiant energy pulse which fires cell 20*a*.

From what has just been said, it will be seen that, for every pair of received radiant energy pulses, the stage 10*a* undergoes a full cycle of operation wherein the first pulse of the pair is registered in the form of an ion discharge in the cell 19*a*, and the second pulse of the pair causes the stage to reset itself to original condition. Thus, if the absence of a radiant energy pulse is considered to represent the binary digit "0," and the presence of a radiant energy pulse is considered to represent the binary digit "1," it will be recognized that the stage 10*a* is in the nature of a scale-of-two counter for these binary digits.

Figure 2:
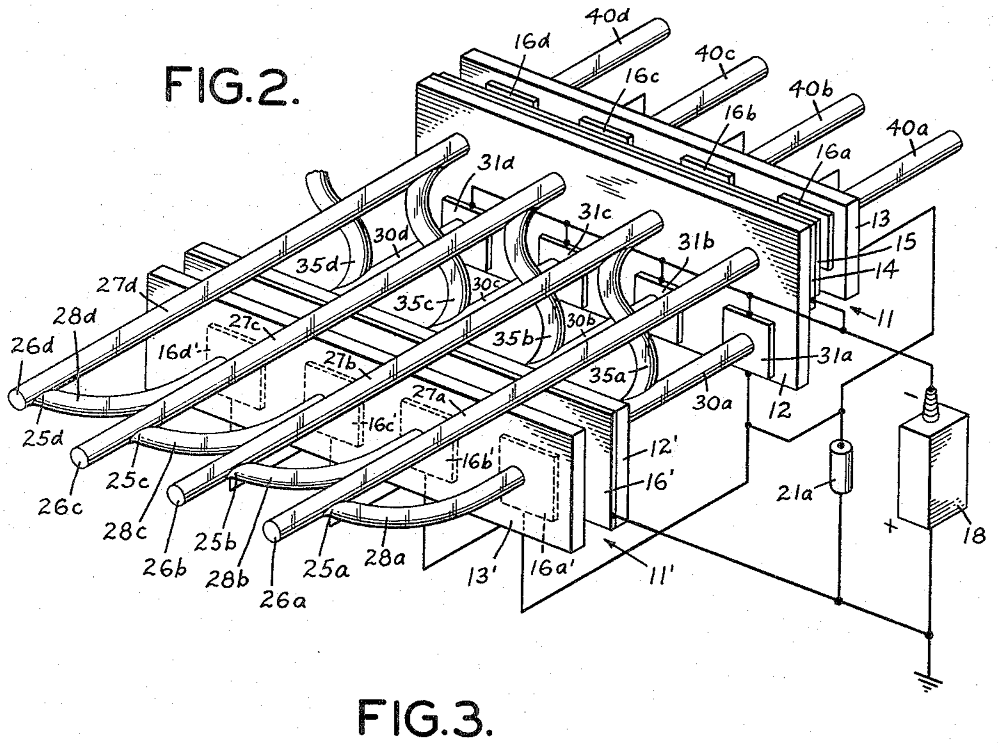
FIG. 2 is a three dimensional view of the embodiment of FIG. 1.

As another application of the scale-of-two counter stage 10*a*, this stage may be integrated along with all the other stages 10*b*, 10*c*, 10*d* into a system (FIGS. 1 and 2) adapted to act as a scale of sixteen binary digit counter. As stated, this integration is obtained in respect to stage 10*a* by an interstage light duct 35*a* which at one end is coupled to light duct 30*a* to receive part of the radiant energy signal from electrode 16′, and which is coupled at the other end to light duct 25*b* to transmit the radiant energy signal to the stage 10*b* to fire the same in the same way as a radiant energy pulse transmitted thereto. In like manner, the stage 10*b* is coupled to the stage 10*c* by the light duct 35*b*, the stage 10*c* is coupled to the stage 10*b* by the light duct 35*c*, and so on. Thus, starting with the stage 10*a* representing the binary digit of lowest rank, each stage in the FIG. 1 system is coupled in the manner described to the stage representing the digit of next higher rank except, of course, for the stage representing the binary digit of highest rank.

With the interstage couplings described, the FIG. 1 system will perform the operations which characterize a binary counter. For example, the stage 10*a* which counts binary digits of rank "1" in decimal terms will register a binary digit "1" if only one radiant energy pulse is received thereby. If a second radiant energy pulse also representing a binary digit "1" is thereafter received by stage 10*a*, the sum of the registered digit "1" and the received digit "1" is a binary digit "1" of rank "2" in decimal terms. There should thus be a "carry" of a binary digit "1" from stage 10*a* to stage 10*b*, and a restoration of stage 10*a* to the condition representing binary digit "0." These two functions are performed by firing, as described, the cell 19*b* of stage 10*b* as a first consequence of the second pulse received by stage 10*a*, and by deionizing, as described, the cell 19*a* in stage 10*a* as a second consequence of the second pulse received by stage 10*a*. In like manner, every other stage, when it has counted two binary digits "1" of its own rank, is adapted to clear itself and to carry over a binary digit "1" to the stage of next higher rank.

A binary digit registered on any stage of the FIG. 1 system is represented by a sustained ion discharge of the cell of that stage which is the counterpart of cell 19*a* in stage 10*a*. Each such ion discharge is overtly manifested by radiant energy emission from an appropriate one of the ion targets 16*a*, 16*b*, 16*c*, 16*d*. The radiant energy emissions of the several ion targets 16*a*, 16*b*, 16*c* and 16*d* are picked up by a corresponding plurality of output light ducts 40*a*, 40*b*, 40*c*, 40*d*. These light ducts may be used to observe visually the presence or absence of a fired condition of the cells 19*a–d*. Moreover, these light ducts may be used to couple the radiant emissions from these cells to devices which perform further binary digit computing operations in response to these emissions.

The above-described embodiments being exemplary only, it will be understood that the instant invention comprehends embodiments differing in form or detail from the presently-described embodiments. For example, the number of binary digits of different rank which can be counted can be increased as desired by increasing the number of stages in the binary counter system. Accordingly, the invention is not to be considered as limited save as is consonant with the scope of the following claims.

I claim:

1. Apparatus comprising, a pair of terminals adapted to receive voltage from a voltage source, resistor means and first radiation responsive means coupled in voltage dividing relation between said terminals, said first means having high and low impedance states respectively manifested by low and high values of voltage drop in said resistor means, said first means being adapted to be changed from the former to the latter state by a radiant energy pulse, second radiation responsive means coupled to said resistor means to respond to such pulse only when said voltage drop is of high value, said second means being adapted to provide an indication upon response to such pulse, and radiant energy conductor means having an input and two outputs respectively coupled to said two radiation responsive means to transmit to each thereof successive radiant energy pulses received at said input.

2. Apparatus as in claim 1 in which said first radiation responsive means is a bistable means having said high and low impedance states as the two bistable states thereof.

3. Apparatus comprising, a pair of terminals adapted to receive voltage from a voltage source, resistor means and first bistable radiation responsive means coupled in voltage dividing relation between said terminals, said first means having high and low impedance states respectively manifested by low and high values of voltage drop in said resistor means, and said first means being adapted to be changed from the former to the latter state by a radiant energy pulse, second radiation responsive means coupled to said resistor means to respond to such pulse only when said voltage drop is of high value, said second means being adapted to provide an indication upon response thereof to such pulse, radiant energy conductor means having an input and two outputs respectively coupled to said two radiation responsive means to transmit to each thereof successive radiant energy pulses received at said input, the first radiant energy pulse in a transmitted pair inducing said change in state of said first means, and means responsive to the indication provided by said second means in response to the second pulse in said pair to restore said first means to said high impedance state.

4. Apparatus comprising, a pair of terminals adapted to receive voltage from a voltage source, resistor means and first bistable radiation responsive means coupled in voltage dividing relation between said terminals, said first means having high and low impedance states respectively manifested by low and high values of voltage drop in said resistor means, and said first means being adapted to be changed from the former to the latter state by a radiant energy pulse, second bistable radiation responsive means coupled with said resistor means to be operatively energized only when said voltage drop is of high value, said second means having reference and anti-reference states and being adapted to be changed from the former to the latter state by such pulse only when said second means is operatively energized, radiant energy conductor means having an input and two outputs respectively coupled to said two radiation responsive means to transmit to each thereof successive radiant energy pulses received at said input, the first radiant energy pulse in a transmitted pair thereof inducing said change in state of said first means, and means responsive to said change in state induced in said second means by the second pulse in said pair to restore said first means to said high impedance state.

5. Apparatus comprising, a pair of terminals adapted to receive voltage from a voltage source, resistor means and a first ion discharge cell coupled in voltage dividing relation between said terminals, said first cell when ionized and deionized having, respectively, a high impedance and a low impedance to correspondingly produce low and high values of voltage drop in said resistor means, said first cell being ionizable by a radiant energy pulse, a second ion discharge cell coupled in parallel relation with said resistor means to be energized at least in part by said voltage drop and to be rendered ionizable by a radiant energy pulse only when said voltage drop is of high value, and radiant energy conductor means having an input and two outputs respectively coupled to said two cells to transmit to each thereof successive radiant energy pulses received at said input.

6. Apparatus comprising, a pair of terminals adapted to receive voltage from a voltage source, resistor means and a first ion discharge cell coupled in voltage dividing relation between said terminals, said first cell when ionized and deionized having, respectively, a high impedance and a low impedance to correspondingly produce low and high values of voltage drop in said resistor means, said first cell being ionizable by a radiant energy pulse, a second ion discharge cell coupled in parallel relation with said resistor means to be energized at least in part by said voltage drop and to be rendered ionizable by a radiant energy pulse only when said voltage drop is of high value, radiant energy conductor means having an input and two outputs respectively coupled to said two cells to transmit to each thereof successive radiant energy pulses received at said input, the first and second radiant energy pulses in a transmitted pair thereof respectively ionizing said first and second cells, and means responsive to said ionizing of said second cell for deionizing said first cell.

7. Apparatus comprising, a pair of terminals adapted to receive voltage from a voltage source, a resistor and a first ion discharge cell coupled in series relation between said terminals, said first cell being adapted to be ionized by a radiant energy pulse, a second ion discharge cell coupled in parallel relation with said resistor and adapted to be ionized by a radiant energy pulse, a first light duct having an input and a plurality of branches for respectively transmitting radiant energy pulses received at said input to said two discharge cells, an ion target of phosphor material in said second cell and adapted to be excited by an ion discharge therein to produce a radiant energy signal, photoelectric means responsive to said radiant energy signal to deionize said first cell by producing at least a partial short thereacross, and a second light duct coupling said second cell and said radiation responsive means to transmit said radiant energy signal from the former to the latter.

8. Apparatus as in claim 7 in which said photoelectric means is a photoconductive impedance connected in shunt relation with said first cell.

9. Apparatus as in claim 7 further comprising an ion target of phosphor material disposed in said first cell to be excited by an ion discharge therein and to produce a radiant energy signal as a manifestation of said excitation.

10. Apparatus comprising, a plurality of binary counter stages representing binary digits of progressively higher rank, radiation responsive means for each stage, each such means being a bistable means adapted to change from a reference to an indicating state in response to a radiant energy pulse, light amplifier means for each stage, each light amplifier means being adapted to provide a radiant energy signal in response to a radiant energy pulse when previously conditioned to respond thereto, radiant energy conductor means for each stage, each conductor means having an input and two outputs respectively coupled to the associated radiation responsive means and light amplifier means to transmit to both thereof successive radiant energy pulses received at said input, means in each stage responsive to said change in state induced in the associated radiation responsive means by the first pulse in a pair transmitted thereto to condition the associated light amplifier means, means in each stage responsive to the radiant energy signal induced in the associated light amplifier means by the second pulse in said pair to restore the associated radiation responsive means of the stage to reference state, and a plurality of radiant energy transmitting means respectively coupled between the light amplifier means of each stage and the radiant energy conductor means of the next higher stage to transmit the radiant energy signal of the former means as a radiant energy pulse to the latter means.

11. Apparatus comprising, a plurality of binary counter stages representing binary digits of progressively higher rank, first light amplifier means disposed in each stage, each first means being a bistable means adapted to change from a darkened to a radiant energy emitting state in response to a radiant energy pulse, second light amplifier means in each stage, each second means being adapted to provide a radiant energy signal in response to a radiant energy pulse when previously conditioned to respond thereto, radiant energy conductor means for each stage, each conductor means having an input and two outputs respectively coupled to the first and second means of the stage to transmit to both thereof successive radiant energy pulses received at said input, means in each stage responsive to a radiant energy emission state induced in said first means by the first pulse in a pair transmitted thereto to condition the second means of the stage, means in each stage responsive to the radiant energy signal induced in the second means of the stage by the second pulse in said pair to restore the first means of the stage to darkened state, and a plurality of radiant energy transmitting means respectively coupled between the second means of each stage and the radiant energy conductor means of the next higher stage to transmit the radiant energy signal of the former means as a radiant energy pulse to the latter means.

12. Apparatus comprising, a plurality of binary counter stages representing binary digits of progressively higher rank, an ion discharge cell for each stage, each cell being ionizable by a radiant energy pulse, an ion target of phosphor material disposed in each cell to provide a luminescent indication of an ion discharge therein, light amplifier means in each stage, each light amplifier means being adapted to provide a radiant energy signal in response to a radiant energy pulse when previously conditioned to respond thereto, radiant energy conductor means for each stage, each conductor means having an input and two outputs respectively coupled to the cell and to the light amplifier means of the stage to transmit to both thereof successive radiant energy pulses received at said input, means in each stage responsive to ionizing of said cell by the first pulse in a pair thereof transmitted to said stage to condition the light amplifier means of the stage, means in each stage responsive to the radiant energy signal induced in the light amplifier means of the stage by the second pulse in said pair to deionize the cell of the stage, and a plurality of radiant energy transmitting means respectively coupled between the light amplifier means of each stage and the radiant energy conductor means of the next higher stage to transmit the radiant energy signal of the former as a radiant energy pulse to the latter.

13. Apparatus comprising, a plurality of binary counter stages representing binary digits of progressively higher rank, a first ion discharge cell in each stage, each first cell being ionizable by a radiant energy pulse, an ion target of phosphor material disposed in each first cell to provide a luminescent indication of an ion discharge therein, a second ion discharge cell in each cell, each second cell being ionizable by a radiant energy pulse only when previously impressed with an ionizing voltage, an ion target of phosphor material disposed in each second cell to provide a radiant energy signal responsive to an ion discharge therein, radiant energy conductor means for each stage, each conductor means having an input and two outputs respectively coupled to the first and second cells of the stage to transmit to both thereof successive radiant energy pulses received at said input, means in each stage responsive to ionizing of the first cell of the stage by the first radiant energy pulse in a pair transmitted thereto to impress an ionizing voltage on the second cell of the stage, means in each stage responsive to the radiant energy signal produced by the second cell of the stage in response to the second pulse in said pair to deionize said first cell, and a plurality of radiant energy transmitting means respectively coupled between the second cell of each stage and the radiant energy conductor means of the next higher stage to transmit the radiant energy signal of the former as a radiant energy pulse to the latter.

14. Apparatus comprising, a plurality of binary counter stages representing binary digits of progressively higher rank, a resistor means and a first ion discharge cell coupled in voltage dividing relation in each stage to receive voltage from a voltage source, each first cell when ionized and deionized having, respectively, a high impedance and a low impedance to correspondingly produce low and high values of voltage drop in the associated resistor, each first cell being ionizable by a radiant energy pulse, an ion target of phosphor material disposed in each first cell to provide a luminescent indication of an ion discharge therein, a second ion discharge cell coupled in parallel relation in each stage with the resistor means of the stage to be energized at least in part by the voltage drop in the resistor means, and to be rendered ionizable by a radiant energy pulse only when the said voltage drop is of high value, an ion target of phosphor material disposed in each second cell to provide a radiant energy signal responsive to an ion discharge therein, radiant energy conductor means for each stage, each conductor means having an input and two outputs respectively coupled to the first and second cells of the stage to transmit thereto successive radiant energy pulses received at said input, photoelectric means in each stage responsive to the radiant energy signal produced by the second cell of the stage to deionize the first cell thereof, and a plurality of radiant energy transmitting means respectively coupled between the second cell of each stage and the radiant energy conductor means of the next higher stage to transmit the radiant energy signal of the former as a radiant energy pulse to the latter.

15. Apparatus comprising, a plurality of binary counter stages representing binary digits of progressively higher rank, a resistor and a first ion discharge cell in each stage and coupled in series therein, an ion target of phosphor material disposed in each first cell in the ionization path thereof, a second ion discharge cell coupled in each stage in parallel with the resistor of the stage, a first light duct for each stage, each first duct having an input and a plurality of branches to respectively transmit radiant energy pulses received at the input to the two cells of the stage, an ion target of phosphor material disposed in each second cell in the ionization path thereof, a photoconductive impedance coupled in each stage in shunt relation with the first cell thereof, and a second light duct for each stage, each second light duct having a first branch which transmits radiant energy from the ion target of the second cell of the stage to the first cell thereof, and a second branch which transmits radiant energy from the ion target of the second cell of the stage to the first duct of the next higher stage.

16. An electro-optical device comprising, a pair of terminals adapted to have a potential applied thereto, a plurality of stages connected between said terminals and each including an electroluminescent light source adapted to develop a voltage drop which is a fraction of said applied potential, each of said sources when illuminated being adapted to remain illuminated only while the voltage drop developed across the source is above a predetermined value, impedance means common to said stages and connected between said terminals to develop a voltage drop which is a fraction of said applied potential, said stages being each electrically coupled to said common impedance means, and said impedance means being in circuit with the source of each stage to vary the fraction of applied potential appearing as a voltage drop across each source as a function of the fraction of applied potential appearing as a voltage drop across said impedance means and photoresponsive means connected between said terminals in circuit with said impedance means and responsive to a luminant signal to vary the voltage drop across said impedance means in an amount and direction suitable to extinguish a previously illuminated condition of the source of at least one of said stages.

17. Apparatus comprising, a source of electroluminescent light adapted, when actuated by an input signal at a time when voltage is applied thereto, to become illuminated and to so remain only while said voltage exceeds a predetermined value, input signal means coupled to said source to actuate said source by at least every other one of successive input signals to become illuminated from an originally non-illuminated condition, and electric circuit means at least part of which is electrically coupled to said source to control the voltage applied thereto, said circuit means including a solid state photoconductor which is optically coupled to said source to receive light therefrom upon said source becoming illuminated, and which has a lagging electrical response to said light, and said circuit means being actuated by said lagging response to reduce said voltage below said value after said source becomes illuminated to thereby restore said source to non-illuminated condition.

References Cited in the file of this patent

UNITED STATES PATENTS

| | | |
|---|---|---|
| 2,573,373 | Wales | Oct. 30, 1951 |
| 2,661,899 | Chromy et al. | Dec. 8, 1953 |
| 2,717,121 | Luhn | Sept. 6, 1955 |
| 2,727,683 | Allen et al. | Dec. 20, 1955 |
| 2,732,516 | Speedy | Jan. 24, 1956 |
| 2,735,936 | Gridley | Feb. 21, 1956 |
| 2,742,631 | Rajchman et al. | Apr. 17, 1956 |